United States Patent
Tsai et al.

(10) Patent No.: US 7,742,131 B2
(45) Date of Patent: Jun. 22, 2010

(54) TOUCH PANEL, COLOR FILTER SUBSTRATE AND FABRICATING METHOD THEREOF

(75) Inventors: Wei-Chen Tsai, Hsinchu (TW); Shih-Yu Wang, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 115 days.

(21) Appl. No.: 12/242,940

(22) Filed: Oct. 1, 2008

(65) Prior Publication Data

US 2009/0268131 A1 Oct. 29, 2009

(30) Foreign Application Priority Data

Apr. 28, 2008 (TW) .............................. 97115579 A

(51) Int. Cl.
*G02F 1/1335* (2006.01)
*G03F 1/00* (2006.01)
*G02B 5/20* (2006.01)

(52) U.S. Cl. .................. 349/106; 349/155; 349/156; 349/157; 349/187; 430/7; 250/226

(58) Field of Classification Search ................ 349/156, 349/155, 157, 187, 147, 139, 104, 105, 106, 349/107, 108; 430/7; 250/226

See application file for complete search history.

(56) References Cited

U.S. PATENT DOCUMENTS

| | | | |
|---|---|---|---|
| 6,870,593 B2 | 3/2005 | Satoh | 349/155 |
| 2006/0028598 A1 | 2/2006 | Lee et al. | 349/110 |
| 2007/0182719 A1* | 8/2007 | Lee et al. | 345/173 |
| 2007/0262967 A1 | 11/2007 | Rho | 345/173 |
| 2008/0136980 A1* | 6/2008 | Rho et al. | 349/12 |
| 2008/0239214 A1* | 10/2008 | Lee et al. | 349/106 |
| 2009/0237365 A1* | 9/2009 | Choi et al. | 345/173 |
| 2009/0268131 A1* | 10/2009 | Tsai et al. | 349/106 |
| 2010/0033668 A1* | 2/2010 | Koito et al. | 349/155 |

* cited by examiner

*Primary Examiner*—Brian M Healy
(74) *Attorney, Agent, or Firm*—Jianq Chyun IP Office

(57) ABSTRACT

A method for fabricating a color filter substrate including the following procedures is provided. First, a substrate is provided and a color filter layer is formed thereon. Next, a plurality of sensing spacers is formed on a part of the color filter layer. Then, a planarization layer is formed to cover the color filter layer and expose the sensing spacers. Next, an electrode layer is formed to cover the planarization layer and the sensing spacers. After that, a plurality of main spacers is formed on a part of the electrode layer excluding disposing regions of the sensing spacers, wherein a step height is formed between the main spacers and the electrode layer above sensing spacers.

23 Claims, 7 Drawing Sheets

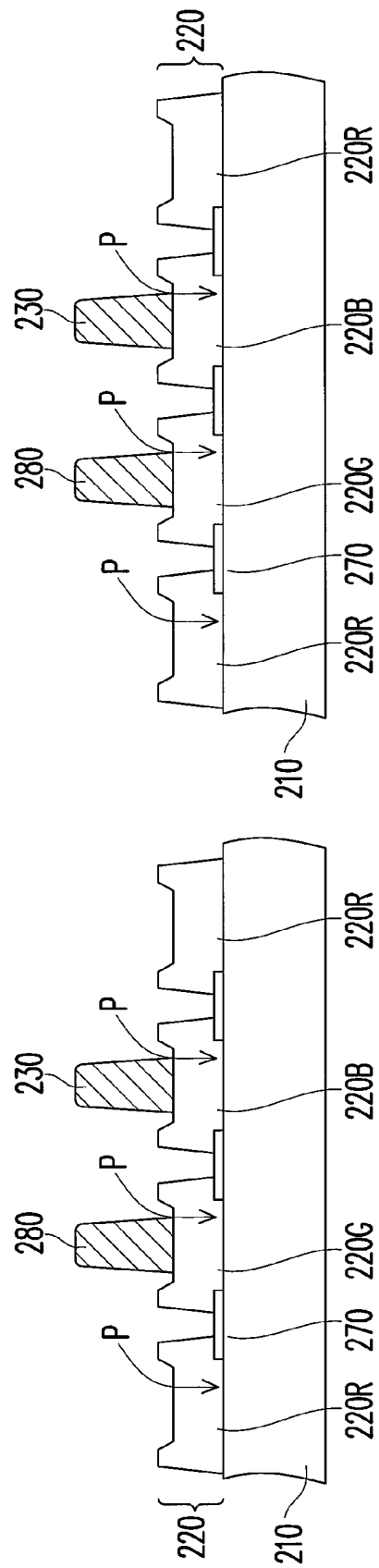

TOUCH PANEL, COLOR FILTER SUBSTRATE AND FABRICATING METHOD THEREOF

CROSS-REFERENCE TO RELATED APPLICATION

This application claims the priority benefit of Taiwan application serial no. 97115579, filed on Apr. 28, 2008. The entirety of the above-mentioned patent application is hereby incorporated by reference herein and made a part of this specification.

BACKGROUND OF THE INVENTION

1. Field of the Invention

The present invention relates to a display panel, a color filter substrate and fabrication methods thereof. More particularly, the present invention relates to a touch panel, a color filter substrate and fabrication methods thereof with a relatively high production yield.

2. Description of Related Art

Recently, with a quick development of information technique, wireless mobile communication and information home appliances, and to achieve advantages of more convenience, more compact size and more humanization, a plurality of conventional input devices such as keyboards or mouse used in information products is changed to touch panels, which are the most popular input devices now days.

FIG. 1A is a cross-sectional view of a conventional touch panel. Referring to FIG. 1A, the touch panel 100 mainly includes a thin film transistor array substrate 110, a color filter substrate 120 and a liquid crystal layer 130 disposed between the above two substrates. The thin film transistor array substrate 110 is mainly composed of a plurality of pixel structures 114 and a plurality of sensing structures 116. The pixel structures 114 have a transparent conductive layer 112 disposed adjacent to the liquid crystal layer 130. Moreover, the color filter substrate 120 is mainly composed of a black matrix 122, a color filter layer 124, a transparent electrode 126, a plurality of main spacers 128 and a plurality of sensing spacers 129. The sensing spacers 129 on the color filter substrate 120 are correspondingly disposed above the sensing structures 116 of the thin film transistor array substrate 110.

As shown in FIG. 1A, the sensing gap of the conventional touch panel 100 are designed by adjusting thickness of films of the thin film transistor array substrate 110. In detail, when a user touches the touch panel 100 with a finger, the sensing spacers 129 and the sensing structure 116 of the touch panel 100 may have an electrical variation (such as a voltage variation or a current variation, etc.) at the touched position. Such electrical variation is converted into a control signal, and is transmitted to a control circuit. Then, a central processing unit performs data processing and calculation to obtain a result. Thereafter, a display signal according to the result is output to a display device from the control circuit so that a corresponding image is displayed to the user.

However, since the main spacers 128 and the sensing spacers 129 of such conventional touch panel 100 are simultaneously fabricated between the transparent electrode 126 and the color filter layer 124, the transparent electrode 126 covered on the main spacers 128 may be easily short circuited with the transparent conductive layer 112 on the thin film transistor array substrate 110 due to particles or defective fabrication process thereof, so that the touch panel may have an adverse phenomenon of line defects as shown in FIG. 1B, or have an adverse phenomenon of dot defects as shown in FIG. 1C. Therefore, a production yield or a sensing effect of the touch panel 100 is decreased, and accordingly an operational efficiency or a whole displaying quality of the touch panel 100 is decreased. Thus, how to properly dispose the sensing spacers and the main spacers in the touch panel to prevent the aforementioned dot defects and line defects has become one of the major subjects presently for touch panel.

SUMMARY OF THE INVENTION

Accordingly, the present invention is directed to a color filter substrate having no electrode layer covering main spacers thereof, which may effectively avoid a short circuit phenomenon between two substrates thereof while being applied to a touch panel, so as to improve a production yield.

The present invention is directed to a method for fabricating a color filter substrate, in which a step height may be adjusted by fabricating a planarization layer with various thicknesses, so as to obtain better uniformity of the main spacers and effectively simplify a fabrication process thereof and improve a production yield.

The present invention is directed to a touch panel, which may effectively avoid a short circuit phenomenon between two substrates thereof, so as to provide a preferred touch operation and displaying quality when being applied to a display device.

The present invention provides a method for fabricating a color filter substrate. The method may be described as follows. First, a substrate is provided and a color filter layer is formed thereon. Next, a plurality of sensing spacers is formed on a part of the color filter layer. Next, a planarization layer is formed to cover the color filter layer, and expose the sensing spacers. Next, an electrode layer is formed to cover the planarization layer and the sensing spacers. Thereafter, a plurality of main spacers is formed on a part of the electrode layer excluding the sensing spacers, so that a step height is formed between the main spacers and the electrode layer above the sensing spacers.

In an embodiment of the present invention, the color filter layer includes a plurality of red filter films, a plurality of green filter films and a plurality of blue filter films. In an embodiment, the sensing spacers are directly formed on a part of the color filter layer, and the main spacers are formed on a part of the electrode layer above the color filter layer.

In an embodiment of the present invention, while forming the sensing spacers, a plurality of sub spacers is respectively formed on the color filter layer, wherein a step height between the sub spacers and the sensing spacers on the substrate is substantially zero.

In an embodiment of the present invention, before the color filter layer is formed, a black matrix is formed on the substrate, wherein the black matrix defines a plurality of pixel areas on the substrate, and the color filter layer is formed within the pixel areas.

In an embodiment of the present invention, a method of forming the electrode layer includes, for example, fully forming an electrode material layer on the planarization layer and the sensing spacers.

In an embodiment of the present invention, material of the electrode layer comprises indium tin oxide or indium zinc oxide.

In an embodiment of the present invention, a same mask process is applied for forming the main spacers and forming the sensing spacers.

In an embodiment of the present invention, a method of forming the main spacers includes, for example, forming a photosensitive material layer first, and then patterning the photosensitive material layer to form the main spacers.

In an embodiment of the present invention, a method of forming the sensing spacers includes, for example, forming a photosensitive material layer first, and then patterning the photosensitive material layer to form the sensing spacers.

The present invention provides a color filter substrate including a substrate, a color filter layer, a plurality of sensing spacers, a planarization layer, an electrode layer and a plurality of main spacers. The color filter layer is disposed on the substrate, and the sensing spacers are respectively disposed on a part of the color filter layer. The planarization layer covers the color filter layer and exposes the sensing spacers. The electrode layer covers the planarization layer and the sensing spacers. The main spacers are respectively disposed on a part of the electrode layer excluding disposing regions of the sensing spacers, wherein a step height is formed between top surfaces of the main spacers and a surface of the electrode layer above the sensing spacer.

In an embodiment of the present invention, the step height is substantially equal to a thickness of the planarization layer.

In an embodiment of the present invention, sizes of the main spacers are substantially the same to that of the sensing spacers.

In an embodiment of the present invention, the color filter substrate further includes a plurality of sub spacers respectively disposed on a part of the color filter layer, wherein a step height between the sub spacers and the sensing spacers on the substrate is substantially zero.

In an embodiment of the present invention, the color filter substrate further includes a black matrix, wherein the black matrix defines a plurality of pixel areas, and the color filter layer is disposed within the pixel areas.

In an embodiment of the present invention, the thickness of the planarization layer is substantially between 1 micrometer to 2 micrometers.

In an embodiment of the present invention, the thickness of the main spacers or the sensing spacers is substantially between 4 micrometers to 5 micrometers.

The present invention provides a touch panel including a first substrate, a color filter layer, a plurality of sensing spacers, a planarization layer, an electrode layer, a plurality of main spacers, a second substrate and a liquid crystal layer. The color filter layer is disposed on the first substrate. The sensing spacers are respectively disposed on a part of the color filter layer. The planarization layer covers the color filter layer and exposes the sensing spacers. The electrode layer covers the planarization layer and the sensing spacers. The main spacers are respectively disposed on a part of the electrode layer excluding disposing regions of the sensing spacers, wherein a step height is formed between top surfaces of the main spacers and a surface of the electrode layer above the sensing spacers. Moreover, the second substrate has at least one pixel structure and one sensing structure, wherein the sensing structure corresponds to the sensing spacer and forms a sensing gap therebetween, and the liquid crystal layer is disposed between the first substrate and the second substrate.

Accordingly, on the color filter substrate of the present invention, the main spacers and the sensing spacers are respectively disposed at two sides of the electronic layer, and when the color filter substrate is applied to the touch panel, the conventional short circuit problem may be avoided, and therefore a preferred displaying quality and touching efficiency may be implemented. Moreover, according to the method for fabricating the color filter substrate, a size of the step height may be adjusted by adjusting the thickness of the planarization layer while forming the color filter layer, so that not only the fabrication process is simplified, but also the main spacers have better uniformity and the sensing gap may have a design margin, and the short circuit problem of the touch panel may be further avoided.

In order to make the aforementioned and other objects, features and advantages of the present invention comprehensible, a preferred embodiment accompanied with figures is described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIGS. 3A~3E are fabrication flowcharts of a color filter substrate of the present invention.

DESCRIPTION OF EMBODIMENTS

Figure 1A:
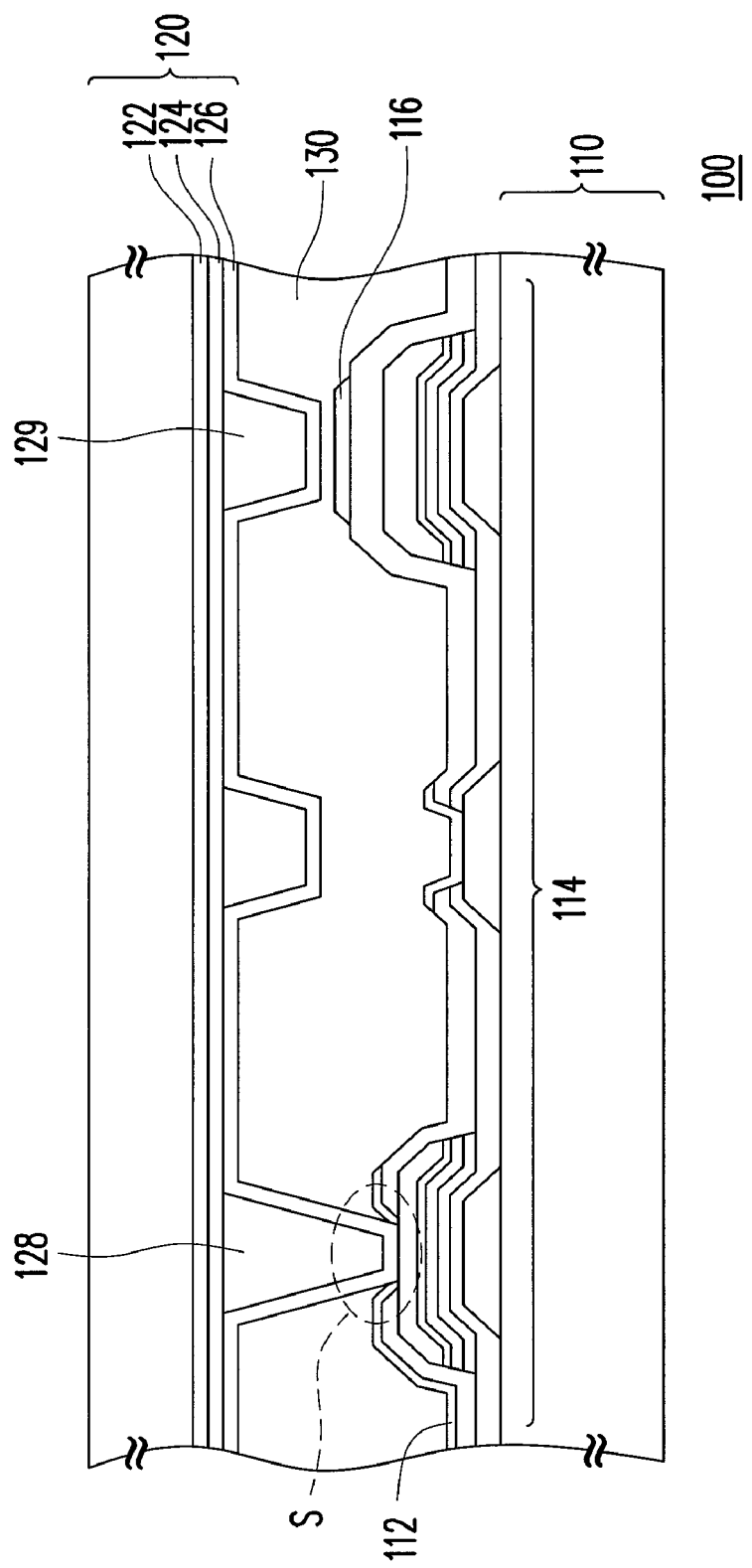
FIG. 1A is a cross-sectional view of a conventional touch panel.
Figure 1C:
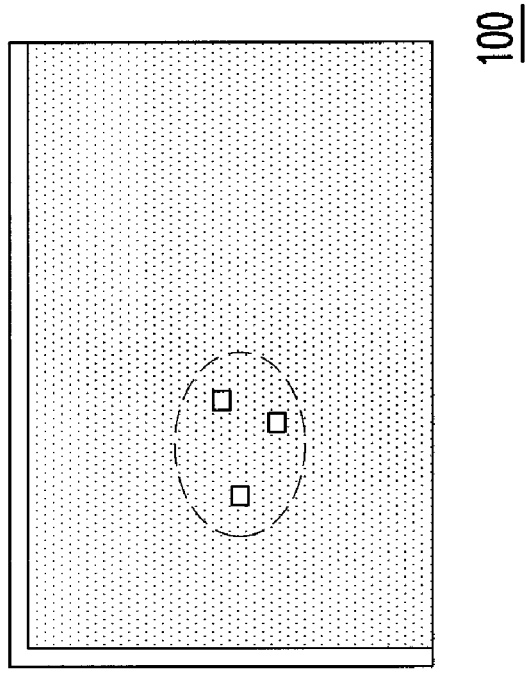
FIG. 1C is a schematic diagram illustrating a dot defect displaying of a conventional touch panel.
Figure 1B:
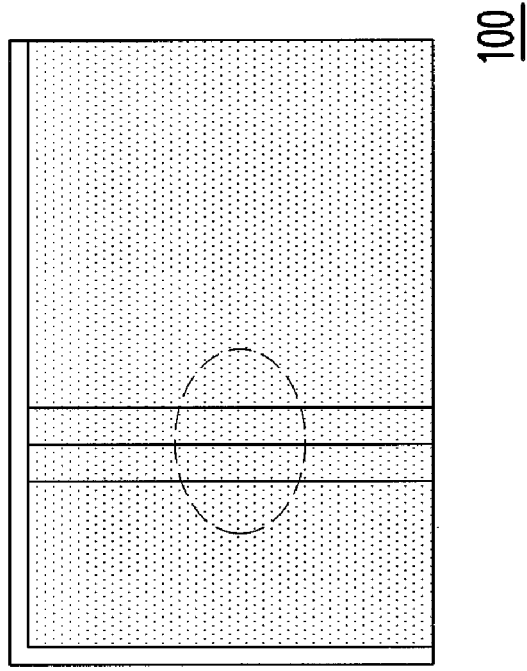
FIG. 1B is a schematic diagram illustrating a line defect displaying of a conventional touch panel.
Figure 2A:
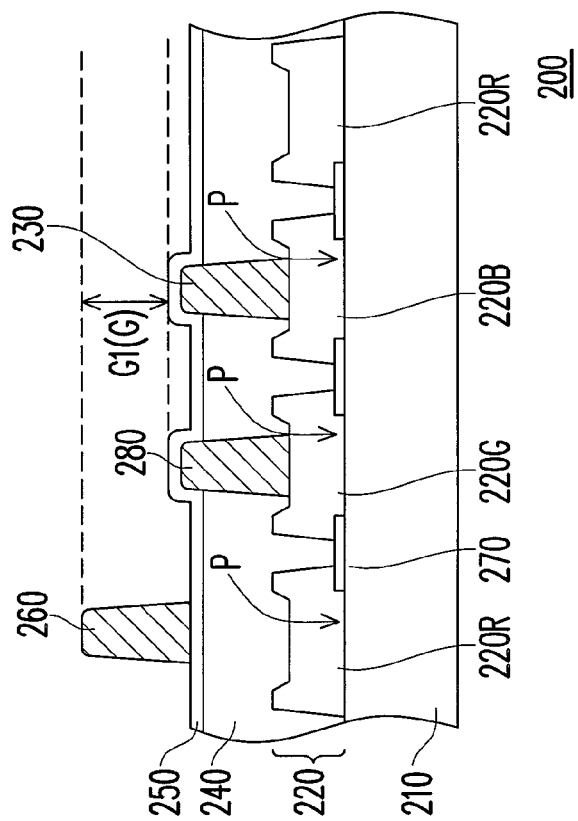
FIG. 2A and FIG. 2B are schematic diagrams respectively illustrating a color filter substrate according to an embodiment of the present invention.
Figure 2B:
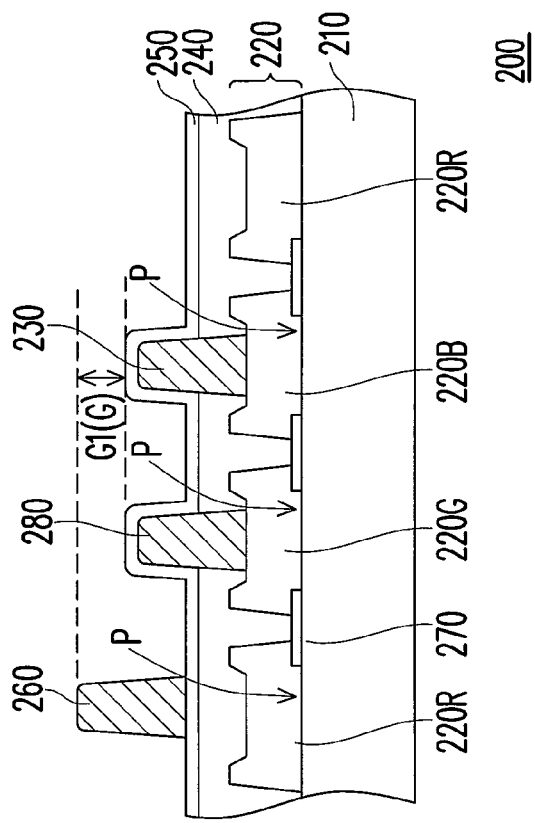

FIG. 2A and FIG. 2B are schematic diagrams respectively illustrating a color filter substrate according to an embodiment of the present invention, wherein the color filter substrates 200 respectively with two different step heights are taken as an example. Referring to FIG. 2A and FIG. 2B, the color filter substrate 200 includes a substrate 210, a color filter layer 220, a plurality of sensing spacers (or sensing protrusions) 230, a planarization layer 240, an electrode layer 250 and a plurality of main spacers (or main protrusions) 260. Quantities of the main spacers 260 and the sensing spacers 230 on the substrate 210 may be equal or unequal, which is determined according to actual requirements (such as sizes of the substrate and pixel, or other design specifications).

As shown in FIG. 2A and FIG. 2B, the color filter layer 220 is disposed on the substrate 210, wherein material of the substrate 210 may be inorganic or organic transparent materials such as glass or plastic, etc., and the color filter layer 220 is, for example, composed of a plurality of red filter films 220R, a plurality of green filter films 220G and a plurality of blue filter films 220B. The red filter films 220R, the green filter films 220G and the blue filter films 220B may arranged in a stripe pattern on the substrate 210, and may also be arranged in a triangle pattern, a mosaic pattern or a four-pixel pattern, which is not limited by the present invention. Moreover, to further improve color saturations of the color filter layer 220, so as to improve a whole visual effect of a display device applying the color filter substrate 200, in the present invention, a black matrix 270 may be disposed between adjacent filter films of the color filter layer 220, wherein the black matrix 270 defines a plurality of pixel areas P, and the color filter layer 220 is disposed within the pixel areas P.

Referring to FIG. 2A and FIG. 2B, the sensing spacers 230 are respectively disposed on a part of the color filter layer 220. The planarization layer 240 covers the color filter layer 220 for flattening a topography difference of the films such as the color filter layer 220 under the electrode layer 250 and for obtaining a uniform and planarized top surface, wherein the material of the planarization layer 240 is, for example, organic materials composed of acrylic resin or novolac resin. Certainly, the material of the planarization layer 240 may also be inorganic materials having a planarization effect, though the present invention is not limited thereto. It should be noted that the planarization layer 240 may expose the sensing spacers 230. For example, a thickness of the planarization layer 240, such as substantially between 1 micrometer to 2 micrometers, is less than a thickness of the sensing spacers 230, such as substantially between 4 micrometers to 5 micrometers, so that surfaces of the sensing spacers 230 can protrude out from the surface of the planarizaton layer 240 for about 2 micrometers to 4 micrometers.

Referring to FIG. 2A and FIG. 2B again, the electrode layer 250 covers the planarization layer 240 and the sensing spacers 230, wherein the electrode layer 250 is for example, fully covers the planarization layer 240 and the sensing spacers 230, and a photolithographic etching process is not required. Moreover, the main spacers 260 are respectively disposed on a part of the electrode layer 250 excluding disposing regions of the sensing spacers 230, shown as the main spacer 260 located above the red filter film 220R in figures. When the color filter substrate 200 is applied to a touch panel 400 (shown as FIG. 4), the main spacers 260 then may be used for maintaining a gap between the color filter substrate 200 and the thin film transistor array substrate 210.

It should be noted that in the present embodiment, the main spacers 260 and the sensing spacers 230 may be fabricated by a same mask process, and sizes of the main spacers 260 and the sensing spacers 230 may be approximately the same. In other words, in an embodiment, a thickness of the main spacers 260 is substantially between 4 micrometers to 5 micrometers.

Moreover, during an actual application, a plurality of sub spacers (or sub protrusions) 280 may further be disposed at a suitable region of the color filter substrate for aiding a function of the main spacers 260, shown as the sub spacers 280 above the green filter film 220G in figures. A step height between the sub spacers 280 and the sensing spacers 230 on the substrate 210 is substantially zero. Namely, sizes of the sub spacers 220 and the sensing spacers 230 and the thickness of the base color filter layer 220 are approximately the same. Moreover, in the present embodiment, shapes of the main spacers 260, the sensing spacers 230 and the sub spacers 280 are substantially rectangles. In another embodiment, the shapes of the main spacers 260, the sensing spacers 230 and the sub spacers 280 may also be trapezoids or other profiles. Therefore, shapes, sizes, quantities of the main spacers 260, the sensing spacers 230 and the sub spacers 280, and colors of the base color filter layer 220 are not limited by the present invention.

Particularly, as shown in FIG. 2A and FIG. 2B, a step height G is formed between the top surfaces of the main spacers 260 and the surface of the electrode layer 250 above the sensing spacers 230, which is approximately equal to the thickness of the planarization layer 240. In other words, it should be noted that different to the conventional technique, the main spacers 260 are exposed above the electrode layer 250, and when the main spacers 260 are applied to the touch panel 400 (shown FIG. 4), a short circuit phenomenon between the main spacers 260 of a non-touching operational area and a transparent conductive layer (shown as FIG. 4) on the thin film transistor array substrate 210 may be effectively prevented.

According to the above description, the present invention provides a color filter substrate 200, in which the step height G may be adjusted according to adjusting the thickness of the planarization layer 240 during a present fabrication process. For example, the color filter substrate 200 of FIG. 2A has a relatively small step height G1, and the color filter substrate 200 of FIG. 2B has a relatively great step height G2. Therefore, the color filter substrate 200 of the present invention avails improvement of a design margin of the sensing gap. Moreover, when the color filter substrate 200 of the present embodiment is applied to the touch panel 400 (shown as FIG. 4), the short circuit phenomenon between the main spacers 260 of the non-touching operational area and the transparent conductive layer (shown as FIG. 4) on the thin film transistor array substrate 210 may be effectively prevented.

Taking the color filter substrate 200 of FIG. 2A as an example, a fabricating method thereof is further provided. Referring to FIG. 2A and FIGS. 3A~3E for detailed description of the method. FIGS. 3A~3E are fabrication flowcharts of a color filter substrate of the present invention, which are respectively a cross-sectional view of the color filter substrate during the fabrication process thereof.

As shown in FIG. 3A, first, the substrate 210 is provided, and the color filter layer 220 is formed on the substrate 210, wherein the material of the substrate 210 may be inorganic or an organic transparent materials such as glass or plastic, etc., and the color filter layer 220 is, for example, composed of a plurality of red filter films 220R, a plurality of green filter films 220G and a plurality of blue filter films 220B. In the present embodiment, four filter films are illustrated in figures, so that a displaying device applying the color filter substrate 200 may have a full color display function. Arrangement methods of the red filter films 220R, the green filter films 220G and the blue filter films 220B are not limited by the present invention, and the red filter films 220R, the green filter films 220G and the blue filter films 220B may be arranged in a stripe pattern or other patterns such as a triangle pattern, a mosaic pattern or a four-pixel pattern. The color filter layer 220 may be formed by coating a resin material layer (not shown) on the substrate 210 via spin coating, slit coating or spin-less coating. Next, the resin material layer is patterned, and a method of patterning the resin material layer includes soft baking, exposing, developing, and hard baking, etc. of the resin material layer.

It should be noted that to further improve color performances of each color filter film of the color filter layer 220, in the present invention, the black matrix 270 is formed on the substrate 210 before forming the color filter layer 220. As shown in FIG. 3A, the black matrix 270 disposed on the substrate 210 so as to defines a plurality of the pixel areas P, and the color filter layer 220 is filled within the pixel areas P, so as to obtain preferred color saturations of the color filter layer 220, and accordingly improve a whole visual effect of the touch panel 400 (shown as FIG. 4).

Next, as shown in FIG. 3B, a plurality of the sensing spacers 230 is formed on a part of the color filter layer 220. Moreover, while forming the sensing spacers 230, in the present embodiment, the sub spacers 280 may be further formed on a part of the color filter layer 220, as shown in figures. A step height between the sub spacers 280 and the sensing spacers 230 on the substrate 210 is substantially zero, namely, sizes of the sub spacers 280 and the sensing spacers 230 are approximately the same. In another embodiment, the sub spacers 280 may also be formed at periphery regions (not shown) of the color filter layer 220, for example, the sub spacers 280 may be formed on a part of the black matrix 270 surrounding to each color filter film, so that a step height is formed between the color filter layer 220 and the periphery area without the color filter layer 220, and accordingly a step height is also formed between the sensing spacers 230 and the sub spacers 280. Moreover, the sub spacers 280 and the sensing spacers 230 may be fabricated by applying a same mask process, and a method of forming the sensing spacers 230 includes forming a photosensitive material layer (not shown) on the color filter layer 220 first, and then patterning the photosensitive material layer to form the sensing spacers 230.

Figures 3C, 3D:
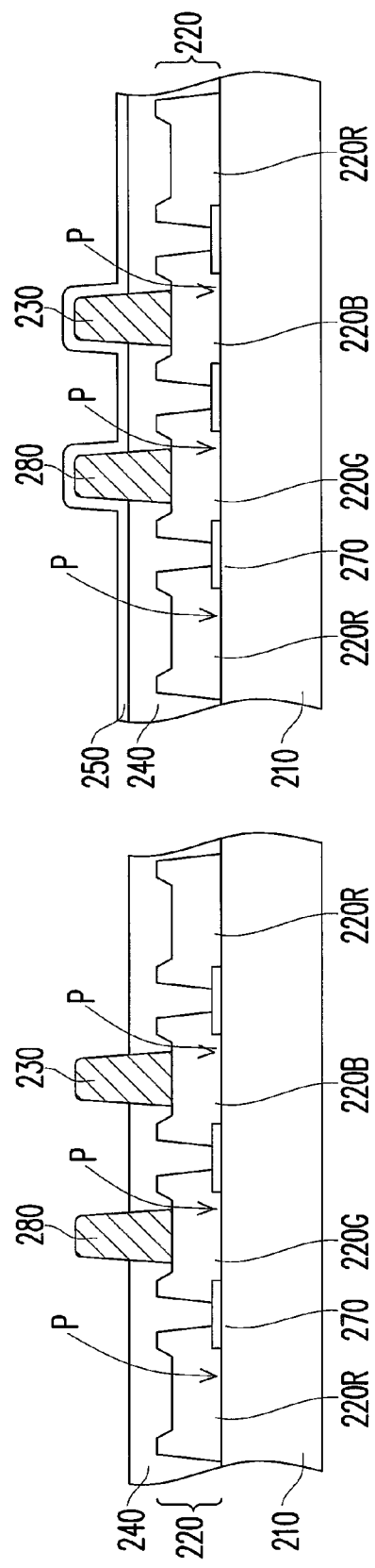

Next, as shown in FIG. 3C, the planarization layer is formed to cover the color filter layer 220 and the sensing spacers 230. In the present embodiment, the planarization layer may simultaneously cover the sub spacers 280. The planarization layer 240 may be fabricated via the spin coating, the slit coating or the spin-less coating, and material of the planarization layer 240 may be organic material composed of acrylic resin or novolac resin. Certainly, the material of the planarization layer 240 may also be inorganic material having a planarization effect, though the present invention is not limited thereto. It should be noted that the thickness of the planarization layer 240 may be easily adjusted during actual application, so as to control a height of the sensing spacers 230 protruding out from the surface of the planarization layer 240, and accordingly change a size of the step height G. Therefore, in the present invention, the design margin of the sensing gap may be increased under simple fabrication conditions. To be specific, during the spin coating for example, the desired thickness of the planarization layer 240 may be controlled by adjusting a spin speed or fine-tuning a spin time thereof, and therefore the fabrication process thereof is quite simple.

Next, as shown in FIG. 3D, the electrode layer 250 is formed on the planarization layer 240, the sensing spacers 230 and the sub spacers 280, and the electrode layer 250 may fully cover the planarization layer 240, the sensing spacers 230 and the sub spacers 280. A method of forming an electrode material layer includes for example, forming an indium tin oxide layer or an indium zinc oxide layer on the planarization layer 240, the sensing spacers 230 and the sub spacers 280 via a sputtering process. It should be noted that patterning of the electrode layer 250 is not required, and therefore fabrication process is simplified.

Figure 3E:
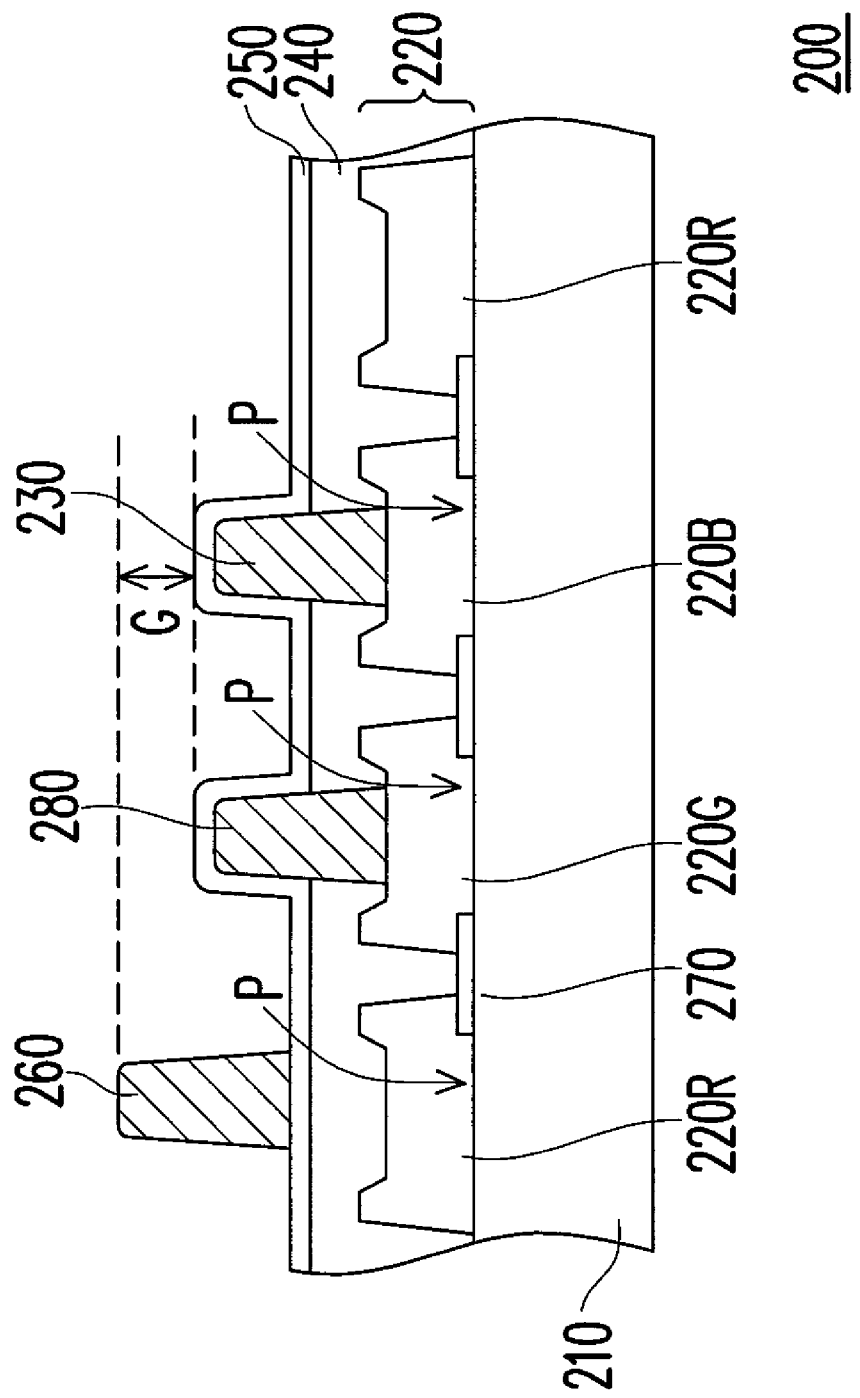

Next, as shown in FIG. 3E, a plurality of the main spacers 260 is formed on a part of the electrode layer 250 excluding the disposing regions of the sensing spacers 230. For example, in FIG. 3E, the main spacers 260 are formed on the electrode layer 250 above the red filter film 220R. Size of the main spacers 260 are for example, approximately the same to that of the sensing spacers 230, so that a step height is formed between the main spacers 260 and the electrode layer 250 above the sensing spacers 230 to form the step height G. Similar to the method of forming the sensing spacers 230, the method of forming the main spacers 260 includes forming a photosensitive material layer (not shown) on the electrode layer 250 first, and then patterning the photosensitive material layer to form the main spacers 260. It should be noted that a same mask process may be applied for patterning the main spacers 260 and patterning the sensing spacers 230, and therefore expensive fabrication cost of the photo-mask may be saved, and therefore a whole fabrication cost thereof is greatly reduce.

Particularly, as shown in FIG. 3E, since heights of bases of the sensing spacers 230 and the main spacers 260 are different, a height difference of the bases may be adjusted based on a simple process of adjusting the thickness of the planarization layer 240, so that the step height is formed between the main spacers 260 and the electrode layer 250 above sensing spacers 230 to form the step height G. It should be noted that the size of the step height G may be adjusted according to design requirements of pixel size, cell gap, distribution density of the main spacers 260 or other design requirements in an actual application, so that design of the touch panel 400 applying such color filter substrate 200 is more flexible. Moreover, since the thickness of the main spacers 260 is more uniform and there is no electrode layer 250 located above the main spacers 260, the short circuit problem of a conventional touch panel is then effectively avoided, and therefore production yield thereof is greatly improved.

Figure 4:
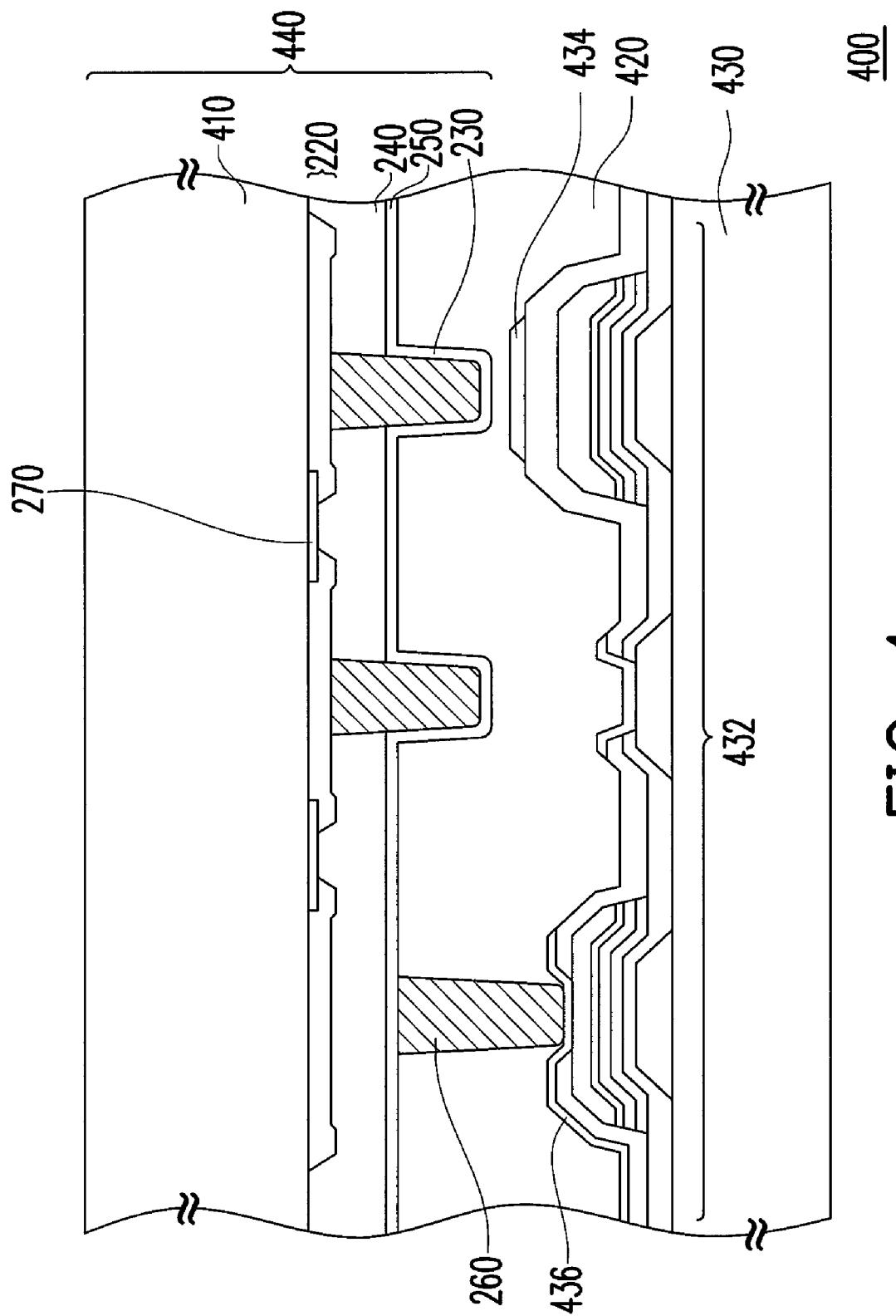
FIG. 4 is a cross-sectional view of a touch panel according to an embodiment of the present invention.

FIG. 4 is a cross-sectional view of a touch panel according to an embodiment of the present invention. Referring to FIG. 4, the touch panel 400 of the present embodiment includes a first substrate 410, a color filter layer 220, a plurality of sensing spacers 230, a planarization layer 240, an electrode layer 250, a plurality of main spacers 260, a second substrate 430 and a liquid crystal layer 420. In the present embodiment, the touch panel 400 further includes a black matrix 270, and the color filter layer 220 is disposed on the first substrate 410. As shown in FIG. 4, the first substrate 410, the color filter layer 220, the planarization layer 240, the plurality of sensing spacers 230, the electrode layer 250 and the plurality of main spacers 260 may form a color filter substrate 440. The color filter substrate 440 may be the aforementioned color filter substrate 200. Disposition relations of the first substrate 410, the color filter layer 220, the planarization layer 240, the plurality of sensing spacers 230, the electrode layer 250 and the plurality of main spacers 260 are the same to that of the former embodiment, and therefore detailed description thereof will not be repeated. The second substrate 430 has at least one pixel structure 432 and one sensing structure 434, wherein the sensing structure 434 is disposed correspondingly to the sensing spacer 230 and forms a sensing gap therebetween, and the second substrate 430 may be the thin film transistor array substrate 210. Moreover, the liquid crystal layer 420 is disposed between the first substrate 410 and the second substrate 430.

As shown in FIG. 4, the step height G of the touch panel 400 is mainly designed according to the thickness of the planarization layer 240. In detail, when a user touches the touch panel 400 with a finger, the sensing spacers 230 and the sensing structure 434 of the touch panel 400 may have an electrical variation (such as a voltage variation or a current variation, etc.) at the touched position. Such electrical variation is converted into a control signal, and is transmitted to a control circuit. Then, a central processing unit performs data processing by the control signal and calculation to obtain a result. Thereafter, a display signal is output to a display device from the control circuit, and finally the display device displays a corresponding image for the user.

It should be noted that different to the conventional technique, a side of the main spacers 260 of the touch panel 400, located adjacent to the second substrate 430 does not have the electrode layer 250. Therefore, regardless of during operation of the touch panel 400 or during impure or defective fabrication process of the touch panel 400, the short circuit problem between the main spacers 260 and the transparent conductive layer 436 on the thin film transistor array second substrate 430 may be avoided, and accordingly the production yield of the touch panel 400 is improved.

In summary, the color filter substrate and the touch panel provided by the present invention have at least the following advantages:

1. Disposing of the uniform main spacers on the electrode layer may effectively prevent the short circuit problem, so that the production yield thereof is improved, and a preferred display quality is achieved.

2. In the method of fabricating the color filter substrate, while forming the color filter layer, the size of the step height may be adjusted directly according to the thickness of the planarization layer. Therefore, not only the fabrication process is simplified, but also different step heights may be designed in allusion to different products, so as to improve a touch effect thereof.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for fabricating a color filter substrate, comprising:
    providing a substrate;
    forming a color filter layer on the substrate;
    forming a plurality of sensing spacers on a part of the color filter layer;
    forming a planarization layer to cover the color filter layer and expose the sensing spacers;
    forming an electrode layer to cover the planarization layer and the sensing spacers; and
    forming a plurality of main spacers on a part of the electrode layer excluding the sensing spacers, so that a step height is formed between the main spacers and the electrode layer located above the sensing spacers.

2. The method for fabricating a color filter substrate as claimed in claim 1, wherein the step height is substantially equal to a thickness of the planarization layer.

3. The method for fabricating a color filter substrate as claimed in claim 1, wherein sizes of the main spacers are substantially the same to that of the sensing spacers.

4. The method for fabricating a color filter substrate as claimed in claim 1, wherein the color filter layer comprises a plurality of red filter films, a plurality of green filter films and a plurality of blue filter films.

5. The method for fabricating a color filter substrate as claimed in claim 1, wherein the sensing spacers are directly formed on a part of the color filter layer, and the main spacers are formed on a part of the electrode layer located above the color filter layer.

6. The method for fabricating a color filter substrate as claimed in claim 1 further comprises respectively forming a plurality of sub spacers on the color filter layer while forming the sensing spacers, wherein a step height between the sub spacers and the sensing spacers on the substrate is substantially zero.

7. The method for fabricating a color filter substrate as claimed in claim 1 further comprises forming a black matrix on the substrate before the color filter layer is formed, wherein black matrix defines a plurality of pixel areas on the substrate, and the color filter layer is formed within the pixel areas.

8. The method for fabricating a color filter substrate as claimed in claim 1, wherein the step of forming the electrode layer comprises fully forming an electrode material layer on the planarization layer and the sensing spacers.

9. The method for fabricating a color filter substrate as claimed in claim 1, wherein a material of the electrode layer comprises indium tin oxide or indium zinc oxide.

10. The method for fabricating a color filter substrate as claimed in claim 1, wherein the steps of forming the main spacers and forming the sensing spacers are applied by a same mask process.

11. The method for fabricating a color filter substrate as claimed in claim 1, wherein the step of forming the main spacers comprises:
    forming a photosensitive material layer; and
    patterning the photosensitive material layer to form the main spacers.

12. The method for fabricating a color filter substrate as claimed in claim 1, wherein the step of forming the sensing spacers comprises:
    forming a photosensitive material layer; and
    patterning the photosensitive material layer to form the sensing spacers.

13. The method for fabricating a color filter substrate as claimed in claim 1, wherein a thickness of the planarization layer is substantially between 1 micrometer to 2 micrometers.

14. The method for fabricating a color filter substrate as claimed in claim 1, wherein a thickness of the main spacers or the sensing spacers is substantially between 4 micrometers to 5 micrometers.

15. A color filter substrate, comprising:
    a substrate;
    a color filter layer, disposed on the substrate;
    a plurality of sensing spacers, respectively disposed on a part of the color filter layer;
    a planarization layer, covering the color filter layer and exposing the sensing spacers;
    an electrode layer, covering the planarization layer and the sensing spacers; and
    a plurality of main spacers, respectively disposed on a part of the electrode layer excluding the sensing spacers, wherein a step height is formed between top surfaces of the main spacers and a surface of the electrode layer located above the sensing spacers.

16. The color filter substrate as claimed in claim 15, wherein the step height is substantially equal to a thickness of the planarization layer.

17. The color filter substrate as claimed in claim 15, wherein sizes of the main spacers are substantially the same to that of the sensing spacers.

18. The color filter substrate as claimed in claim 15 further comprising a plurality of sub spacers respectively disposed on a part of the color filter layer, wherein a step height between the sub spacers and the sensing spacers on the substrate is substantially zero.

19. The color filter substrate as claimed in claim 15 further comprising a black matrix, wherein the black matrix defines a plurality of pixel area, and the color filter layer is disposed within the pixel areas.

20. The color filter substrate as claimed in claim 15, wherein a thickness of the planarization layer is substantially between 1 micrometer to 2 micrometers.

21. The color filter substrate as claimed in claim 15, wherein thickness of the main spacers or the sensing spacers is substantially between 4 micrometers to 5 micrometers.

22. The color filter substrate as claimed in claim 15, wherein the electrode layer includes a common electrode.

23. A touch panel, comprising:
    a first substrate;
    a color filter layer, disposed on the first substrate;
    a plurality of sensing spacers, respectively disposed on a part of the color filter layer;
    a planarization layer, covering the color filter layer, and exposing the sensing sensing spacers;

an electrode layer, covering the planarization layer and the sensing spacers;

a plurality of main spacers, respectively disposed on a part of the electrode layer excluding disposing regions of the sensing spacers, wherein a step height is formed between top surfaces of the main spacers and a surface of the electrode layer located above the sensing spacers;

a second substrate, having at least one pixel structure and one sensing structure, wherein the sensing structure corresponds to the sensing spacer and forms a sensing gap therebetween; and a liquid crystal layer, disposed between the first substrate and the second substrate.

* * * * *